US007994455B2

(12) United States Patent
Song et al.

(10) Patent No.: US 7,994,455 B2
(45) Date of Patent: Aug. 9, 2011

(54) CONTROL CIRCUIT FOR FAST HEATING OF A POSITIVE-TEMPERATURE-COEFFICIENT HEATING COMPONENT

(75) Inventors: Qun Song, Sunnyvale, CA (US); Fang Xie, Shanghai (CN); Qi Wu, Shanghai (CN); Zeyu Huang, Shanghai (CN)

(73) Assignee: Pericom Technology Inc., San Jose, CA (US)

( * ) Notice: Subject to any disclaimer, the term of this patent is extended or adjusted under 35 U.S.C. 154(b) by 972 days.

(21) Appl. No.: 11/870,244

(22) Filed: Oct. 10, 2007

(65) Prior Publication Data

US 2009/0095726 A1 Apr. 16, 2009

(30) Foreign Application Priority Data

Oct. 11, 2006 (CN) .......................... 2006 1 0117028

(51) Int. Cl.
*B23K 1/02* (2006.01)

(52) U.S. Cl. ......... 219/494; 219/497; 219/499; 219/505

(58) Field of Classification Search .................. 219/494, 219/492, 497, 499, 501, 504, 505, 507–508
See application file for complete search history.

(56) References Cited

U.S. PATENT DOCUMENTS

| | | | | | |
|---|---|---|---|---|---|
| 3,789,190 | A * | 1/1974 | Orosy et al. | .................. | 219/497 |
| 4,086,466 | A * | 4/1978 | Scharlack | ...................... | 219/494 |
| 4,443,690 | A * | 4/1984 | Payne et al. | .................. | 219/506 |
| 4,549,074 | A * | 10/1985 | Matsuo | .......................... | 219/505 |
| 4,564,749 | A * | 1/1986 | Ishima | .......................... | 219/497 |
| 6,350,968 | B1 * | 2/2002 | Connolly et al. | ............. | 219/497 |

* cited by examiner

*Primary Examiner* — Mark Paschall
(74) *Attorney, Agent, or Firm* — Stuart T. Auvinen; gpatent LLC

(57) ABSTRACT

Traditional temperature-control products have the problem that the temperature of the working surface reaches the setting temperature too slowly when heating up or recovering from a temperature drop. A traditional temperature control circuit and temperature-settings selector components are modified to solve this problem. When heating begins, the modified circuit increases the initial setting temperature to be above the target setting temperature. The modified circuit then adjusts the setting temperature by measuring the heating power consumption. Once the working surface of the temperature control product reaches the initial setting temperature, the heating power consumption drops and the modified circuit reduces the temperature setting to the target setting temperature. The temperature control product can rapidly achieve the target temperature. A positive-temperature-coefficient heating component is used in the temperature control product.

20 Claims, 9 Drawing Sheets

CONTROL CIRCUIT FOR FAST HEATING OF A POSITIVE-TEMPERATURE-COEFFICIENT HEATING COMPONENT

RELATED APPLICATION

This application claims the benefit under 35 USC §119 of the co-pending application for "A control circuit for fast heating up of the positive temperature coefficient heating component", China App. No. 200610117028.9, filed Oct. 11, 2006.

FIELD OF THE INVENTION

This invention relates to electrical heater control products, and more particularly to control circuits for rapid initial heating.

BACKGROUND OF THE INVENTION

Heating components with a positive temperature coefficient may use an alloy resistor, such as metal-ceramic heater, metal wire, and so on. A noteworthy characteristic of positive-temperature-coefficient heating components (hereinafter referred to the heating components) is that their resistance continues to become larger with an increasing temperature. Such heating elements can be used as a temperature sensor as well as a heat source. A separate temperature sensor is not needed.

FIG. 1 sows a cross-section of a temperature control product. Many temperature control products have a similar mechanical structure. In this example the temperature control product is a curling iron or a curler, both other products are similar.

Handle 1 allows the user to safely hold the product. Thermal conductor 2 transmits heat from heating component 4 at the center of the product to working surface 3 on the outside of the product. Working surface 3 is the useful part of the product for the users, such as the hot iron metal that a user curls the hair around. Heating component 4 is a heater and a temperature sensor and serves two purposes (heating and temperature sensing) as a positive-temperature-coefficient heating element.

FIG. 2 shows a traditional thermostat control circuit. L and N are the connection terminals of the AC power supply (110V or 220V). SCR 206 is a Silicon Controlled Rectifier. Heating component 208 is the positive-temperature-coefficient heating element. Temperature-sampling switch 216 connects SCR 206 to the positive (+) terminal of comparator 202. VCC is a DC power supply that drives current through temperature sampling resistor 214 to the (+) terminal of comparator 202. VCC is divided by temperature-setting resistors 210, 212 to generate a temperature-setting voltage (that corresponds to temperature TSO+) which is applied to the negative (−) terminal of comparator 202. SYNC circuit 204 is zero crossing synchronization circuit for triggering SCR 206. SYNC circuit 204 is driven by the output of comparator 202 and drives the trigger input of SCR 206.

In the positive half-cycle of the AC power, SCR 206 is switched on, and heating component 208 begins heating. During heating, temperature-sampling switch 216 should be disconnected to block the AC high voltage to the comparator 202. Temperature sampling is performed during the period when SCR 206 is switched off and heating is paused.

Temperature-setting resistors 210, 212 generate a reference voltage to comparator 202 that corresponds to setting temperature TSO+. When sampling the temperature, temperature-sampling switch 216 is switched on, and the voltage divided by temperature-sampling resistor 214 and the resistance of heating component 208 is applied to the (+) terminal of comparator 202 as the sampling signal. Comparator 202 compares the sampling signal and the reference voltage corresponding to temperature TSO+, and the output of comparator 202 drives SYNC circuit 204. SYNC circuit 204 generates the trigger signal C that switches SCR 206 on or off according to the compare results from comparator 202. The heating power is controlled by SCR 206 so that heating component 208 maintains itself at a constant temperature corresponding to TSO+.

FIG. 3 shows the temperature of different components of the temperature-control product and power curves during heating.

Line 302 is the temperature curve of the heating component (heating component 4 of FIG. 1 and heating component 208 of FIG. 2). Line 304 is the temperature curve of the working surface (working surface 3 of FIG. 1). Line 306 is the power curve.

FIG. 3 shows that in the traditional temperature control circuit, the temperature of the heating component is set at TSO+ at the beginning of heating. The control circuit initially applies full power (SCR 206 is 100% switch on, marked as "% 100P" in the figure). Later when the temperature of the heating component is detected to reach TSO+, the control circuit reduces the heating power (the switch-on rate of SCR 206), so that the heating component maintains a constant temperature TSO+.

In this kind of the temperature control product, the resistance change of the heating component is used to detect the temperature, so what is controlled is not the temperature of the working surface. The temperature of the heating component, not the temperature of the working surface, is measured. When the heating component reaches the setting temperature TSO+, the temperature of the working surface has not yet reached the target temperature TSO, as can be seen by line 304 slowly rising long after line 302 has reached TSO+.

The heating component (line 302) continues to transmit heat to the working surface (line 304). After some time, the temperature of the working surface rises up to TSO, and at this time, the heating component maintains temperature TSO+. The working surface temperature no longer increases. The heating procedure is finished, and the system enters a temperature-maintaining state. When maintaining temperature, the heating power is equal to the heat dissipated to the surroundings. The temperature of the working surface is maintained at the constant value TSO.

FIG. 3 shows that in the temperature-maintaining state, due to the heat dissipation from the working surface, the temperature TSO+ of the internal heating component is a little higher than the temperature TSO of the working surface. Because the difference is small between TSO+ and TSO in the traditional circuit, this traditional circuit is very slow for transmitting heat. This small temperature difference between TSO+ and TSO provides a small temperature drive, with the disadvantage that the heating up time is very long, as shown by the slow rise of line 304.

DETAILED DESCRIPTION

The present invention relates to an improvement in temperature-control products. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 1:
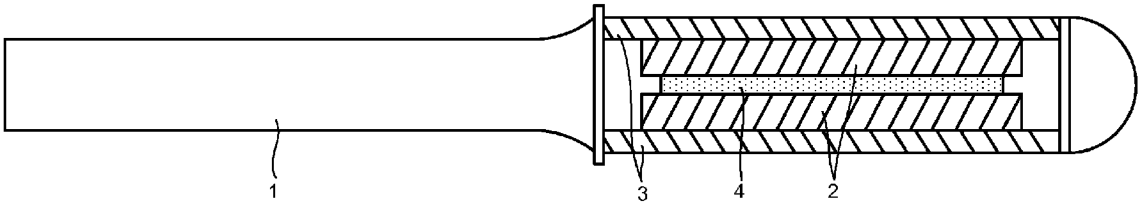
FIG. 1 sows a cross-section of a temperature control product.
Figure 2:
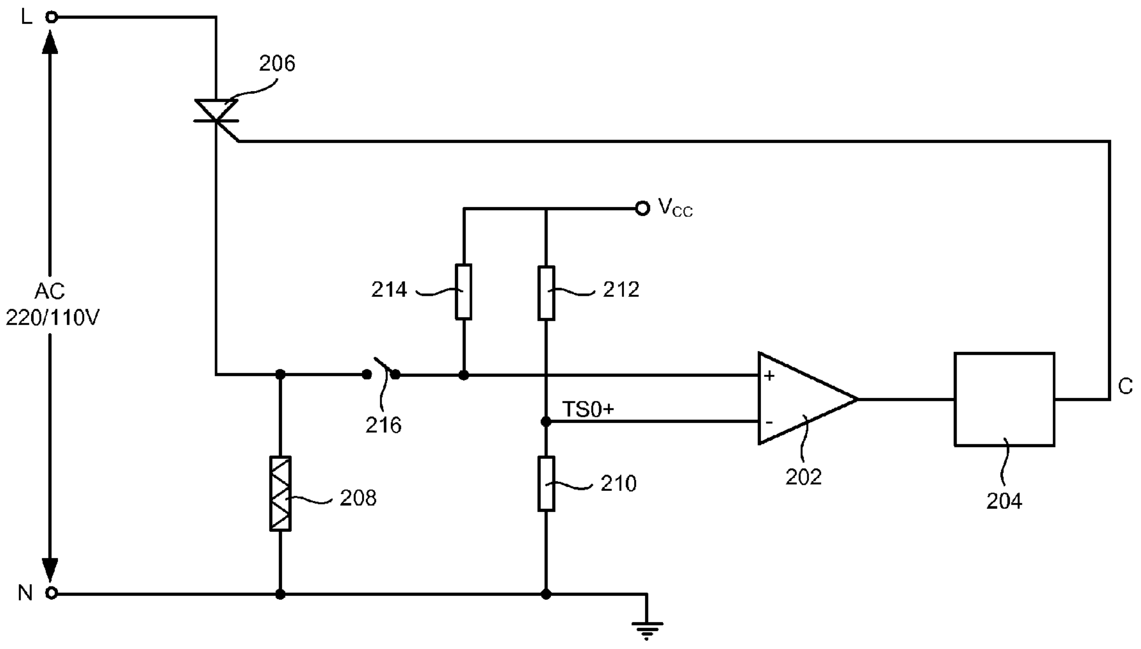
FIG. 2 shows a traditional thermostat control circuit.
Figure 3:
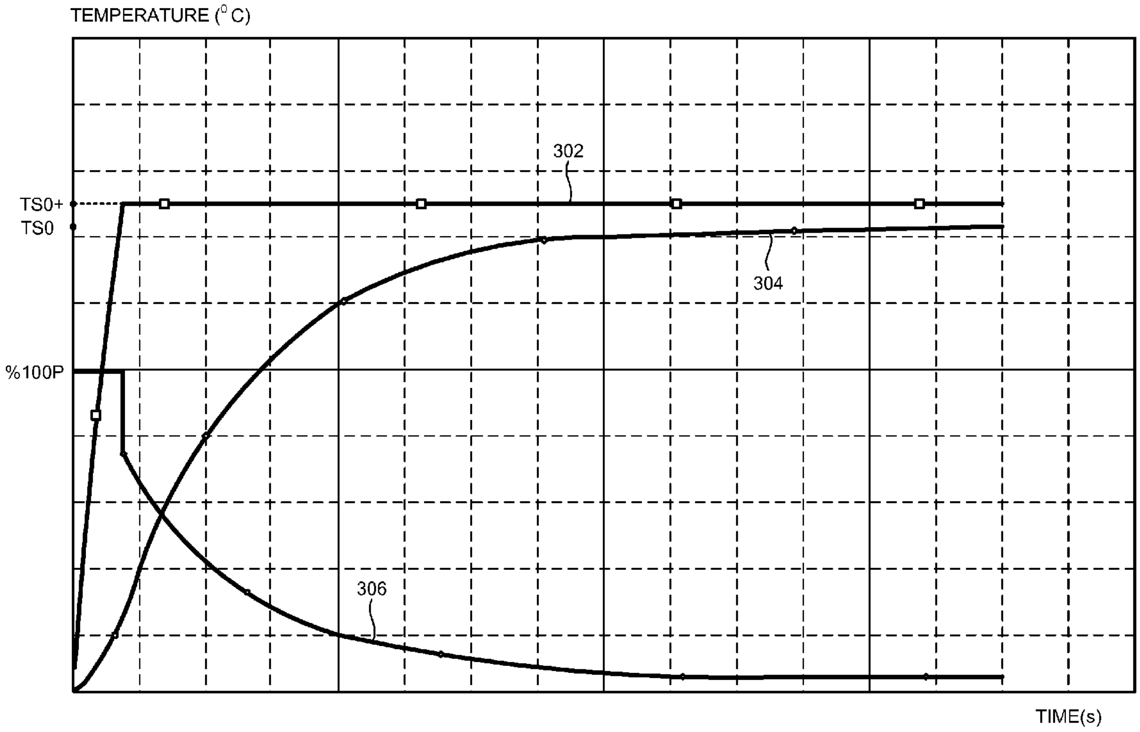
FIG. 3 shows the temperature of different components of the temperature-control product and power curves during heating.
Figure 4:
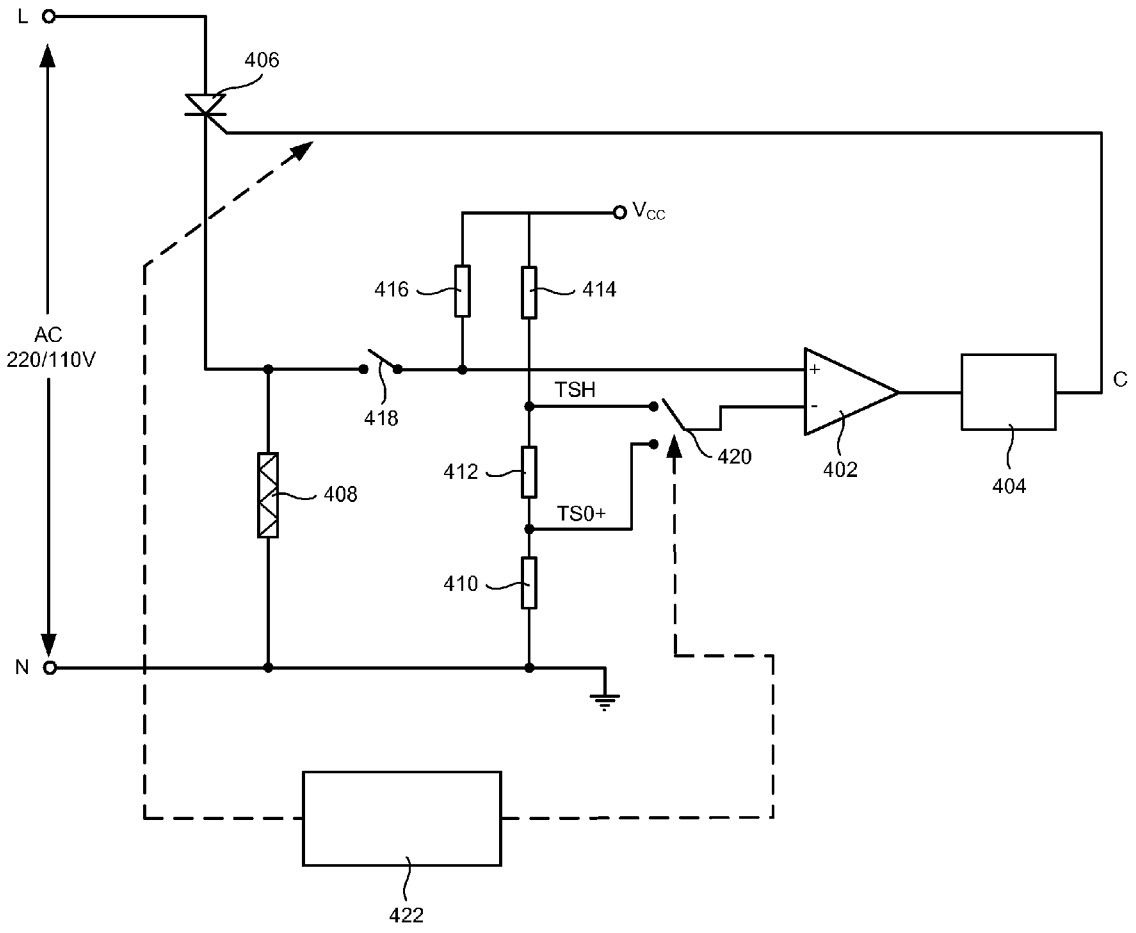
FIG. 4 shows an accelerated initial heating control circuit.

FIG. 4 shows an accelerated initial heating control circuit. Several modifications are made to the traditional control circuit of FIG. 2. A single pole double through switch 420 is added as the temperature setting switch, along with temperature setting selector 422.

Temperature setting selector 422 controls setting switch 420 to adjust the voltage applied to the (−) input of comparator 402. The function of temperature setting selector 422 is to control setting switch 420 according to the actual power consumption. When the power consumption is detected to be higher than a specification power (e.g. 25% of the full power), a voltage corresponding to a higher setting temperature TSH is selected. When the power consumption is detected to be lower than another specification power, a voltage corresponding to the normal setting temperature TSO+ is selected. Power through the heating element can be detected by monitoring the trigger signal, which controls SCR 406 and thus is a good proxy for power.

Reference voltages are generated by temperature-setting resistors 410, 412, 414 that divide VCC. The voltage of the node between temperature-setting resistors 412,414, when selected by setting switch 420 and applied to comparator 420, corresponds to a high setting temperature TSH. The voltage of the node between temperature-setting resistors 412,410, when selected by setting switch 420 and applied to comparator 420, corresponds to a normal setting temperature TSO+.

The setting temperature of heating component 408 at the beginning of the heating procedure is initially set to the higher temperature TSH. Then temperature setting selector 422 adjusts the setting temperature according to the heating power consumption actually measured, such as the power through SCR 406 or to its trigger, so that the working surface of the temperature control product can rapidly achieve the target temperature.

L and N are the connection terminals of the AC power supply (110V or 220V). SCR 406 is a Silicon Controlled Rectifier. Heating component 408 is the positive-temperature-coefficient heating element. Temperature-sampling switch 418 connects SCR 406 to the positive (+) terminal of comparator 402. VCC is a DC power supply SYNC circuit 404 is zero crossing synchronization circuit for triggering SCR 406. SYNC circuit 404 is driven by the output of comparator 402 and drives the trigger input of SCR 406.

During the positive half-cycle of the AC power, SCR 406 is switched on, and heating component 408 begins heating. During heating, temperature-sampling switch 418 should be disconnected to block the AC high voltage to the comparator 402. Temperature sampling is performed during the period when SCR 406 is switched off and heating is paused.

When sampling the temperature, temperature-sampling switch 418 is switched on, and the voltage divided by temperature-sampling resistor 416 and the resistance of heating component 408 is applied to the (+) terminal of comparator 402 as the sampling signal. Comparator 402 compares the sampling signal and the reference voltage selected by setting switch 420, corresponding to either temperature TSH or TSO+. The output of comparator 402 drives SYNC circuit 404. SYNC circuit 404 generates the trigger signal C that switches SCR 406 on or off according to the compare results from comparator 402. The heating power is controlled by SCR 406 so that heating component 408 maintains itself at a constant temperature corresponding to TSO+.

Figure 5:
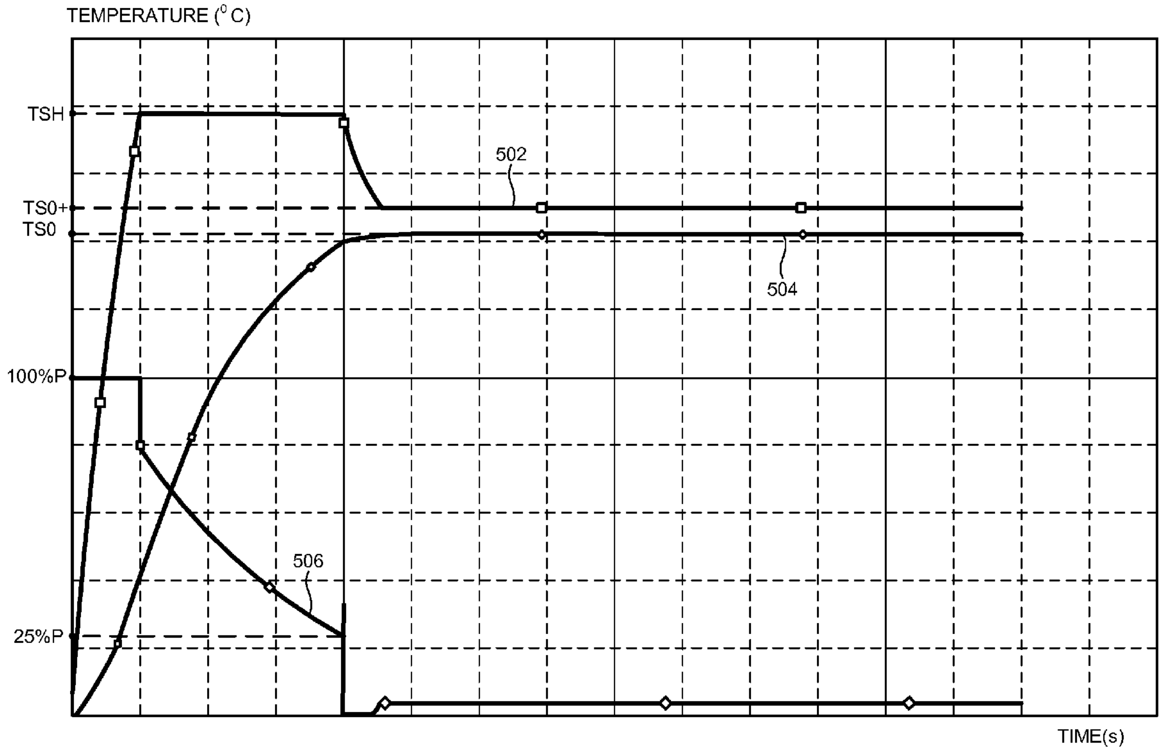
FIG. 5 shows the temperature and power curves for the accelerated initial heating control circuit of FIG. 4.

FIG. 5 shows the temperature and power curves for the accelerated initial heating control circuit of FIG. 4. When heating begins, setting switch 420 is controlled by temperature setting selector 422 to select TSH as the initial setting temperature of the heating component, line 502. In the beginning, the system is heated with full power (% 100P), line 506.

When the temperature of the heating component (line 502) is detected to reach TSH, the control circuit reduces the switch-on rate of SCR 206 to reduce the heating power, as shown by line 506 falling, to maintain the temperature at TSH. At this time, setting switch 420 is still switched to the higher setting temperature TSH. Heat is transmitted rapidly from the heating component to the work surface.

The relatively large temperature difference between TSH and TSO+ causes more rapid heat transmission than in the traditional circuit with the small temperature difference between TSO and TSO+. The working surface is more rapidly heated up.

As the temperature of the working surface rises, line 504, the actual heating power is stepped down, line 506. When the power is detected as being below a specified rate (such as 25%, "25% P" on line 506), the temperature setting selector switches setting switch 420 to the voltage corresponding to the normal temperature setting TSO+. The temperature of heating component 408 drops from TSH to TSO+, as shown by line 502. However, the working surface has already reached its setting temperature TSO, or is nearly at TSO, as shown by line 504.

Choosing the power switching point properly causes the switch from TSH to TSO+ to happen just at the point when the temperature of the working surface achieves TSO (or very near to TSO). When switching TSH to TSO+, SCR 406 switches off immediately and heating stops. Power is cut to zero, as shown by the drop to zero in line 506.

Later, after the temperature of the heating component is reduced to the setting temperature TSO+, heating resumes, and the heating component is maintained at TSO+. Because the temperature of the working surface was already heated up to TSO (or very near to TSO) before the power switches off, the heat-up procedure stops very quickly. The system enters the maintaining-temperature state. When maintaining temperature, the heating power is equal to the heat dissipated to the surroundings, which is low, such as 5% as shown by line 506. The temperature of the working surface is maintained at a constant value TSO, line 504.

Temperature setting selector 422 is designed to control setting switch 420 in response to the actual heating power. Different choices for switching points yield different heating curves.

Figure 6:
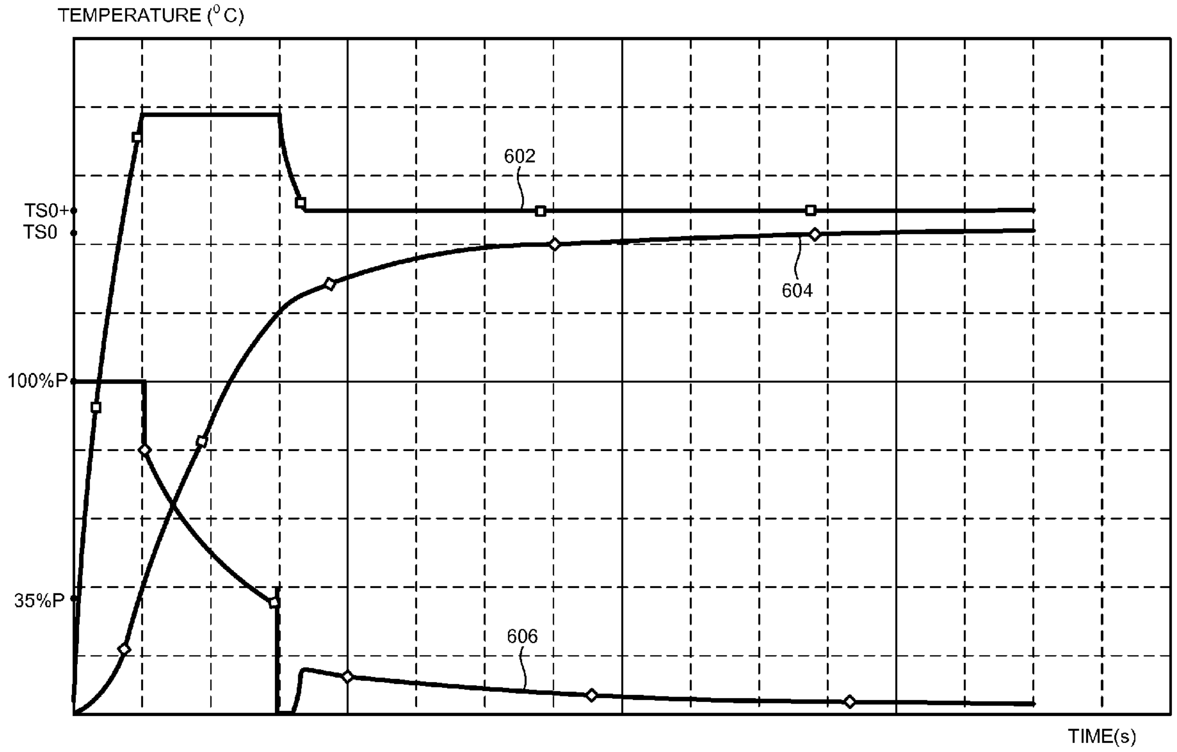
FIG. 6 is a graph of when the switching point is too high.

FIG. 6 is a graph of when the switching point is too high. For example, the switching point is set to 35% of the full power, rather than 25% as shown in FIG. 5. The working surface temperature, line 604, more slowly approaches the heating component temperature TSO+ (line 602) in this example, because power (line 606) is switched to zero early, at 35% P. The fastest temperature rising speed of FIG. 5 is not achieved in this example of FIG. 6.

Figure 7:
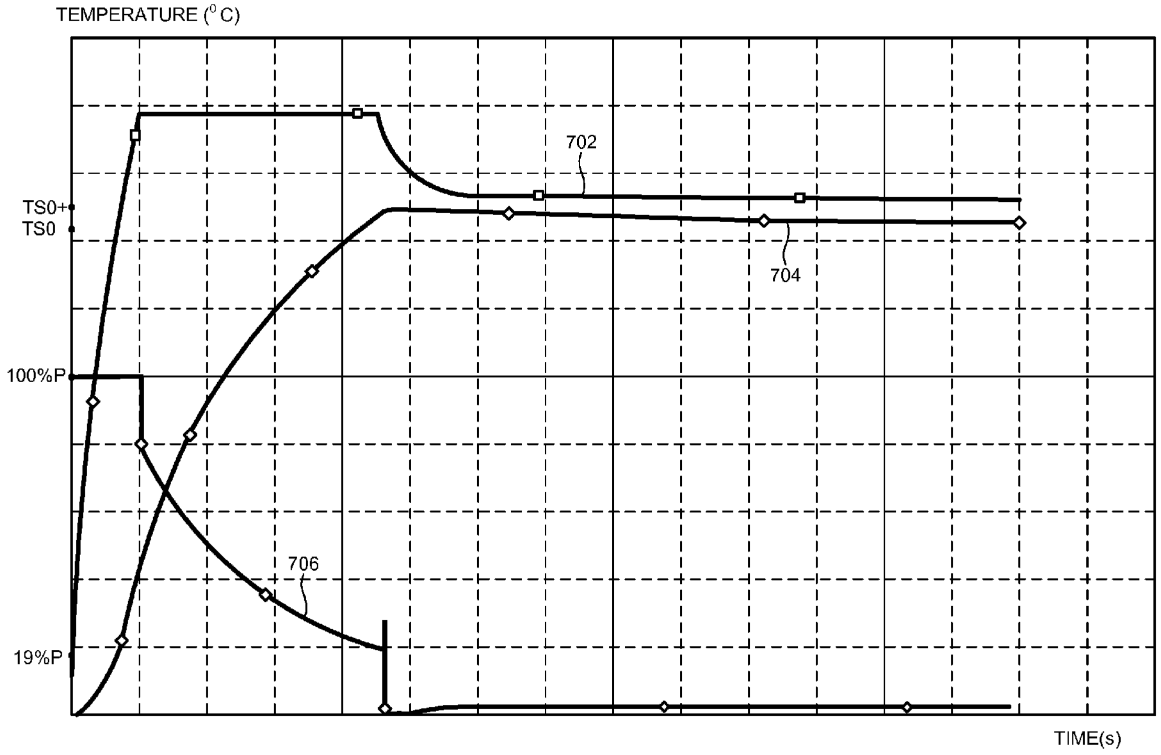
FIG. 7 is a graph of when the switching point is too low.

FIG. 7 is a graph of when the switching point is too low. In this example the switching point is set to 19% of the full power, rather than 25% as shown in FIG. 5. The working surface temperature, line 704, overshoots its target temperature TSO, and slowly drifts back down to TSO. Power (line 706) is switched to zero late, at 19% P.

Choosing the difference between the higher setting temperature TSH and the normal setting temperature TSO+ properly makes the switching power rate suitable for the temperature setting selector to detect.

The temperature of the working surface is reduced if the heat dissipates too much, such as when user operates the product to heat something, such as cold, wet hair being curled. At that time, the control circuit tries to maintain the temperature, and the heating power increases. When the heating power is detected to be higher than a specified rate of full power, the temperature setting selector switches setting switch 420 back to TSH, so that the temperature of the working surface recovers more quickly.

Figure 8:
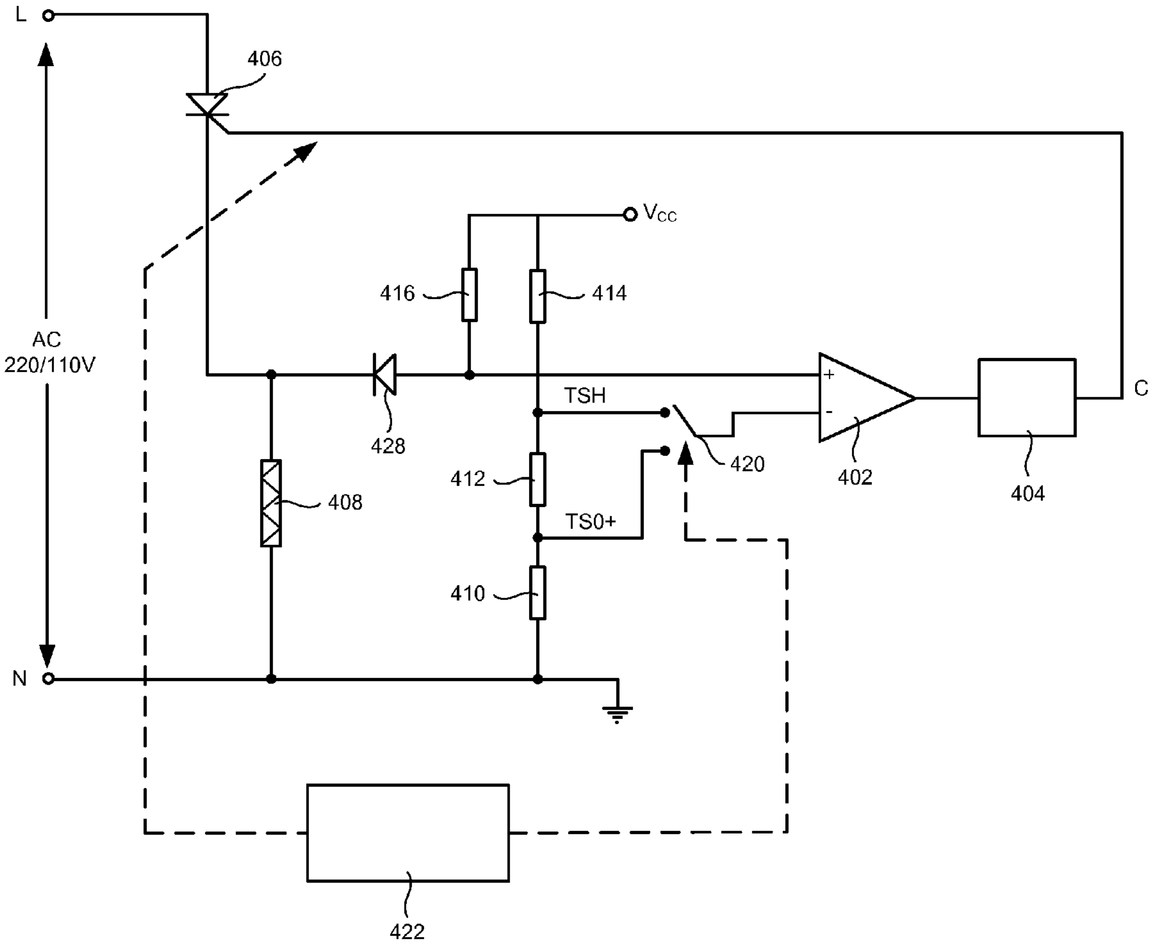
FIG. 8 shows an alternate circuit with a diode replacing the temperature-sampling switch.

FIG. 8 shows an alternate circuit with a diode replacing the temperature-sampling switch. The circuit of FIG. 4 is modified to replace temperature-sampling switch 216 with diode 428. Diode 428 is a rectifier diode that blocks the AC high voltage from reaching comparator 402 during the period when SCR 206 is turned on. Diode 428 does not block temperature sampling when SCR 206 is turned off.

Figure 9:
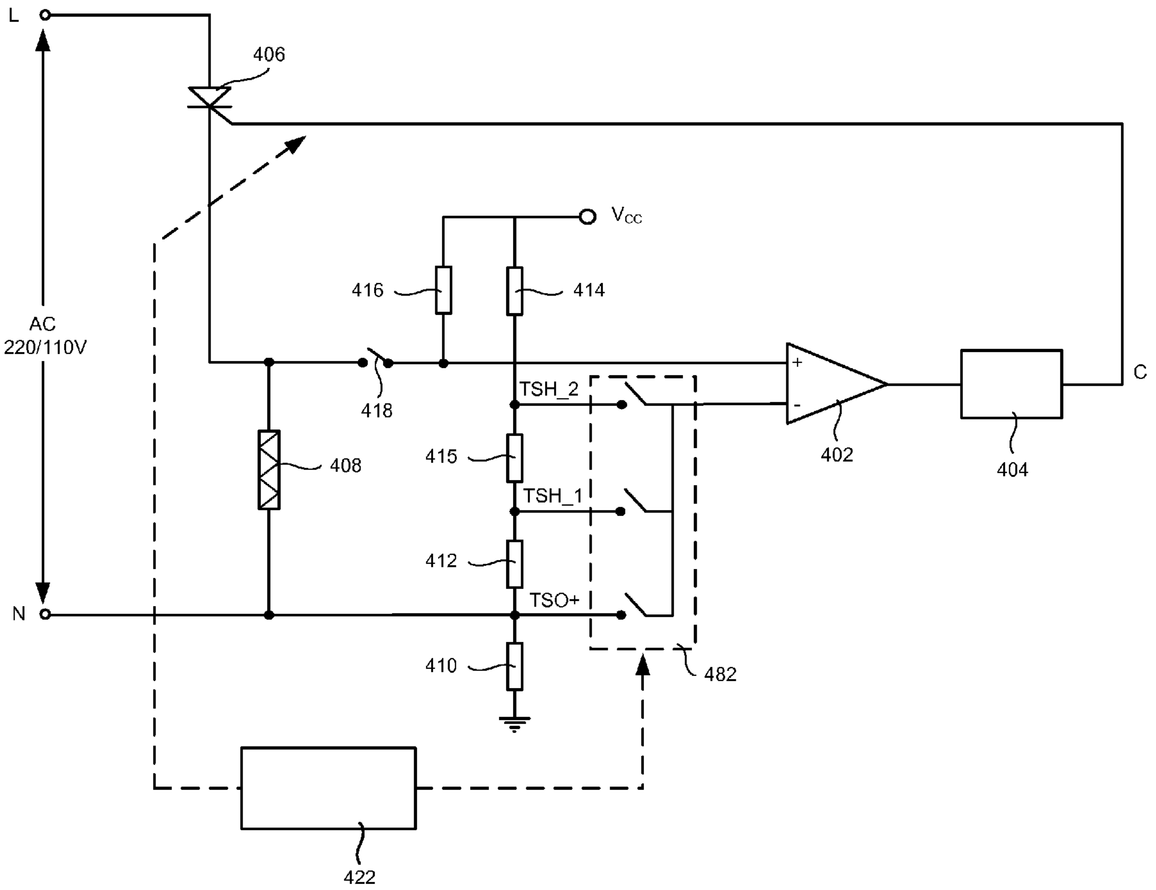
FIG. 9 shows an alternate circuit with a single-pole-multi-through switch.

FIG. 9 shows an alternate circuit with a single-pole-multi-through switch. The circuit of FIG. 4 is modified to replace single-pole-double-through sampling switch 420 with single-pole-multi-through switch 482. Additional resistor 415 between resistors 414, 412 generates third reference TSH_2. Switch 482 selects from among three references voltages corresponding to temperatures TSH_2, TSH_1, TSO+. More than two higher temperatures can be set, such as TSH_1, TSH_2.

Alternate Embodiments

Several other embodiments are contemplated by the inventors. The invention can be extend to several higher temperature settings (15 degrees C., 20 degrees C., higher than normal settings). Several switching points of the power rate (10%, 20%, . . . 50% . . . ) could also be supported, so that the best control can be implemented.

Various components could be added or substituted, such as multi-pole or enhanced switches, additional resistors, bypass capacitors, filters, etc.

The background of the invention section may contain background information about the problem or environment of the invention rather than describe prior art by others. Thus inclusion of material in the background section is not an admission of prior art by the Applicant.

Any methods or processes described herein are machine-implemented or computer-implemented and are intended to be performed by machine, computer, or other device and are not intended to be performed solely by humans without such machine assistance. Tangible results generated may include reports or other machine-generated displays on display devices such as computer monitors, projection devices, audio-generating devices, and related media devices, and may include hardcopy printouts that are also machine-generated. Computer control of other machines is another tangible result.

Any advantages and benefits described may not apply to all embodiments of the invention. When the word "means" is recited in a claim element, Applicant intends for the claim element to fall under 35 USC Sect. 112, paragraph 6. Often a label of one or more words precedes the word "means". The word or words preceding the word "means" is a label intended to ease referencing of claim elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word "means" are not intended to fall under 35 USC Sect. 112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. An accelerated initial heating control circuit comprising:

a comparator that compares a sensing voltage on a first input to a reference voltage on a second input to generate a compare output;

a voltage divider between a power supply and a ground node, the voltage divider generating a first reference voltage and a second reference voltage;

a sensing switch for connecting the first reference voltage to the second input of the comparator in response to a heat-up signal being in a first state, and for connecting the second reference voltage to the second input of the comparator in response to the heat-up signal being in a second state;

a temperature setting selector that detects power through a heating element, for generating the heat-up signal in the first state when power detected is above a threshold power, and for generating the heat-up signal in the second state when power detected is below the threshold power; and a temperature-sampling switch coupled between the heating element and the comparator, for disconnecting the heating element from the first input of the comparator when the heating element is being heated, and for connecting the heating element to the first input of the comparator when the heating element is being sensed for temperature measurement.

2. The accelerated initial heating control circuit of claim 1 wherein the first reference voltage corresponds to a first temperature setting of the heating element;

wherein the second reference voltage corresponds to a second temperature setting of the heating element;

wherein the first temperature setting is higher than the second temperature setting;

wherein the sensing switch selects the first reference voltage that corresponds to the first temperature setting when the temperature setting selector detects power above the threshold power, whereby a higher temperature setting is selected when power above the threshold power is detected through the heating element.

3. The accelerated initial heating control circuit of claim 2 wherein power through the heating element is above the threshold power during initial heating up of the heating element, whereby heating is initially accelerated by selection of a higher temperature setting.

4. The accelerated initial heating control circuit of claim 2 further comprising:

a silicon-controlled rectifier (SCR) coupled between a heater power supply and the heating element, the SCR disconnecting the heater power supply from the heating element when the heating element is being sensed for temperature measurement, the SCR having a trigger input for controlling activation of the SCR; and a trigger circuit, receiving the compare output from the comparator, for generating a trigger signal applied to the trigger input of the SCR.

5. The accelerated initial heating control circuit of claim 4 wherein the temperature setting selector that detects power through the heating element is coupled to receive the trigger signal to detect power through the SCR and through the heating element.

6. The accelerated initial heating control circuit of claim 4 wherein the voltage divider comprises:

a first resistor between the power supply and a first node having the first reference voltage;

a second resistor between the first node and a second node having the second reference voltage; and a tail resistor between the second node and the ground node.

7. The accelerated initial heating control circuit of claim 4 wherein the voltage divider comprises:

a first resistor between the power supply and a first node having the first reference voltage;

a second resistor between the first node and a second node having the second reference voltage;

a third resistor between the second node and a third node having a third reference voltage; and a tail resistor between the third node and the ground node;

wherein the sensing switch is a multi-way switch that is further for connecting the third reference voltage to the second input of the comparator.

8. The accelerated initial heating control circuit of claim 4 further comprising:

a sensing resistor between the power supply and the first input of the comparator.

9. The accelerated initial heating control circuit of claim 4 further comprising:

the heating element; and the heater power supply which comprises an alternating-current (A.C.) power supply and wherein the power supply comprises a direct-current (D.C) power supply.

10. The accelerated initial heating control circuit of claim 9 further comprising:

a working surface that is used by a user to apply heat to an object;

a thermal conductor between the heating element and the working surface;

wherein the accelerated initial heating control circuit controls heating of the heating element to compensate for a temperature drop across the thermal conductor by selecting the first reference voltage corresponding to the first temperature setting that is a higher temperature setting when detected power is above the threshold power, wherein the higher temperature setting increases heat transfer to the working surface across the thermal conductor when high power is detected.

11. The accelerated initial heating control circuit of claim 10 wherein the working surface comprises a working surface of a hair-curling iron.

12. The accelerated initial heating control circuit of claim 4 wherein the heating element has a positive temperature coefficient.

13. The accelerated initial heating control circuit of claim 4 wherein the temperature-sampling switch is an isolation diode that protects the comparator from damage due to high voltages applied to the heating element.

14. A heating control circuit comprising:

a circuit power supply input for receiving a direct current;

a heater power supply input for receiving an alternating current;

comparator means for comparing a sensing voltage on a first input to a reference voltage on a second input to generate a compare output;

voltage generator means, coupled to the circuit power supply input, for generating a first reference voltage and a second reference voltage;

sensing switch means for connecting the first reference voltage to the second input of the comparator means in response to a heat-up signal being in a first state, and for connecting the second reference voltage to the second input of the comparator means in response to the heat-up signal being in a second state;

temperature setting selector means for detecting power through a heating element, for generating the heat-up signal in the first state when power detected is above a threshold power, and for generating the heat-up signal in the second state when power detected is below the threshold power;

temperature-sampling switch means, coupled between the heating element and the comparator means, for disconnecting the heating element from the first input of the comparator means when the heating element is being heated, and for connecting the heating element to the first input of the comparator means when the heating element is being sensed for temperature measurement;

silicon-controlled rectifier (SCR) means, coupled between the heater power supply input and the heating element, for disconnecting the heater power supply input from the heating element when the heating element is being sensed for temperature measurement, the SCR means having a trigger input for controlling activation of the SCR means; and trigger circuit means, receiving the compare output from the comparator means, for generating a trigger signal applied to the trigger input of the SCR means.

15. The heating control circuit of claim 14 wherein the first reference voltage corresponds to a first temperature setting of the heating element;

wherein the second reference voltage corresponds to a second temperature setting of the heating element;

wherein the first temperature setting is higher than the second temperature setting;

wherein the sensing switch means is for selecting the first reference voltage that corresponds to the first temperature setting when the temperature setting selector means detects power above the threshold power, whereby a higher temperature setting is selected when power above the threshold power is detected through the heating element.

16. The heating control circuit of claim 15 wherein power through the heating element is above the threshold power during initial heating up of the heating element, whereby heating is initially accelerated by selection of a higher temperature setting.

17. A temperature-control product comprising:

a heating body having a positive temperature coefficient;

a heater power supply for powering the heating body;

a silicon-controlled rectifier (SCR) coupled between the heater power supply and the heating body, the SCR disconnecting the heater power supply from the heating body during a temperature-sensing time period, the SCR having a trigger input;

a comparator for comparing a sensing voltage on a first input to a reference voltage on a second input to generate an output signal indicating a temperature of the heating body;

a sensing power supply;

an isolation device coupled between the first input of the comparator and the heating body to supply a sensing current into the heating body during the temperature-sensing time period;

a voltage generator coupled to the sensing power supply, the voltage generator generating a first reference voltage and a second reference voltage;

a sensing switch that selects the first reference voltage or the second reference voltage to apply to the second input of the comparator in response to a heating-up signal; and a temperature setting selector, coupled to the trigger input of the SCR, for generating the heating-up signal in an activated state when power through the SCR to the heating body is above a threshold power, whereby temperature settings that correspond to reference voltages are selected in response to power above the threshold power.

18. The temperature-control product of claim 17 further comprising:

a zero crossing synchronization circuit, coupled between the comparator and the trigger input of the SCR.

19. The temperature-control product of claim 18 wherein the isolation device is a switch or a diode.

20. The temperature-control product of claim 17 further comprising:

a working surface that is used by a user to apply heat to an object;

a thermal conductor between the heating body and the working surface;

wherein the sensing switch is controlled to compensate for a temperature drop across the thermal conductor by selecting the first reference voltage corresponding to a first temperature setting that is a higher temperature setting when detected power is above the threshold power, wherein the higher temperature setting increases heat transfer to the working surface across the thermal conductor when high power is detected.

* * * * *